United States Patent
Chen

(10) Patent No.: US 10,425,904 B2
(45) Date of Patent: Sep. 24, 2019

(54) COMMUNICATION SYSTEM, COMMUNICATION TERMINAL, AND BASE STATION

(71) Applicant: FUJITSU LIMITED, Kawasaki-shi, Kanagawa (JP)

(72) Inventor: Hongyang Chen, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 664 days.

(21) Appl. No.: 14/869,255

(22) Filed: Sep. 29, 2015

(65) Prior Publication Data

US 2016/0021620 A1 Jan. 21, 2016

Related U.S. Application Data

(63) Continuation of application No. PCT/JP2013/060398, filed on Apr. 4, 2013.

(51) Int. Cl.
*H04W 52/24* (2009.01)
*H04W 4/70* (2018.01)
(Continued)

(52) U.S. Cl.
CPC ........ *H04W 52/242* (2013.01); *H04W 4/70* (2018.02); *H04W 52/146* (2013.01);
(Continued)

(58) Field of Classification Search
CPC ................................................. H04W 52/228
See application file for complete search history.

(56) References Cited

U.S. PATENT DOCUMENTS

| 2008/0188260 A1* | 8/2008 | Xiao | H04W 52/146 455/522 |
| 2009/0325625 A1 | 12/2009 | Hugl et al. | |
| 2013/0033992 A1* | 2/2013 | Higuchi | H04W 72/085 370/246 |

FOREIGN PATENT DOCUMENTS

| CN | 101601198 A | 12/2009 |
| JP | 2010-517492 A | 5/2010 |

(Continued)

OTHER PUBLICATIONS

International Search Report issued for corresponding International Patent Application No. PCT/JP2013/060398, dated May 7, 2013, with an English translation.

(Continued)

*Primary Examiner* — Ankur Jain
(74) *Attorney, Agent, or Firm* — Myers Wolin, LLC

(57) ABSTRACT

A communication system includes: a group including a plurality of communication terminals; and a base station. A first communication terminal in the group includes: an estimation unit that estimates path loss between the first communication terminal and the base station; and a transmission unit that transmits information about the estimated path loss to the base station. The base station includes: a reception unit that receives information about the path loss transmitted from the first communication terminal; and a transmission unit that transmits the received information about the path loss to second communication terminals other than the first communication terminal in the group. Each of the second communication terminals includes: a reception unit that receives the information about the path loss transmitted from the base station; and a determination unit that determines transmit power of the second communication terminal based on the received information about the path loss.

3 Claims, 5 Drawing Sheets

(51) Int. Cl.
*H04W 52/14* (2009.01)
*H04W 4/08* (2009.01)
*H04W 24/10* (2009.01)
*H04W 52/38* (2009.01)
*H04W 52/50* (2009.01)

(52) U.S. Cl.
CPC .......... *H04W 52/247* (2013.01); *H04W 4/08* (2013.01); *H04W 24/10* (2013.01); *H04W 52/383* (2013.01); *H04W 52/50* (2013.01)

(56) References Cited

FOREIGN PATENT DOCUMENTS

| JP | 2011-250092 A | 12/2011 |
| JP | 2012-85010 A | 4/2012 |
| JP | 2012-85011 A | 4/2012 |
| WO | 2011/099509 A1 | 8/2011 |
| WO | 2011/123755 A1 | 10/2011 |

OTHER PUBLICATIONS

Shinkichi Ikeda et al., "Standardization activity on cellular-based Machine-to-Machine Communication" Panasonic Technical Journal, Apr. 15, 2011, vol. 57, No. 1, pp. 60-62, section 3.1, with English abstract.

Vodafone, "Proposed SID: Provision of low-cost MTC UEs based on LTE", Agenda Item: 13.1.1, TSG RAN Meeting #53, RP-111112, Fukuoak, Japan, Sep. 13-16, 2011.

Huawei et al., "Overview on low-cost MTC UEs based on LTE", Agenda Item: 7.6, 3GPP TSG-RAN WG1 Meeting #66 bis, R1-112912, Zhuhai, China, Oct. 10-14, 2011.

Sony Corporation et al., "Considerations on approaches for low-cost MTC UEs", Agenda Item: 7.6, 3GPP TSG-RAN WG1 Meeting #66bis, R1-112917, Zhuhai, China, Oct. 10-14, 2011.

Ericsson et al., "Standards aspects impacting UE costs", Agenda Item: 7.6, 3GPP TSG-RAN WG1 Meeting #66bis, R1-112929, Zhuhai, China, Oct. 10-14, 2011.

3GPP TR 36.888 V2.0.0, "3rd Generation Partnership Project; Technical Specification Group Radio Access Network; Study on provision of low-cost MTC UEs based on LTE; (Release 11)", Jun. 2012.

Notice of Preliminary Rejection issued by the Korean Intellectual Property Office for corresponding Korean Patent Application No. 10-2015-7026407, dated Sep. 1, 2016, with English translation.

Office Action issued by the Japan Patent Office for corresponding Japanese Patent Application No. 2015-509824, dated Nov. 15, 2016, with an English translation.

Notication of Reasons for Refusal issued by the Japan Patent Office for corresponding Japanese Patent Application No. 2015-509824, dated May 9, 2017, with an English translation.

Interdigital Communications, "A method to trigger detached devices using broadcast channel", Agenda Item: 9.4, TD S2-112562, 3GPP TSG SA WG2 Meeting #85, 3rd Generation Partnership Project (3GPP), Xian, China, May 16-20, 2011.

Extended European search report with the supplementary European search report and the European search opinion issued for corresponding European Patent Application No. 13881034.6 dated Dec. 21, 2015.

First Notification of Office Action issued by the State Intellectual Property Office of China for corresponding Chinese Patent Application No. 201380075170.X, dated Dec. 22, 2017, with an English translation.

* cited by examiner

COMMUNICATION SYSTEM, COMMUNICATION TERMINAL, AND BASE STATION

CROSS-REFERENCE TO RELATED APPLICATION

This application is a continuation application of International Application PCT/JP2013/060398, filed on Apr. 4, 2013, and designating the U.S., the entire contents of which are incorporated herein by reference.

FIELD

The present invention relates to a communication system, a communication terminal, and a base station.

BACKGROUND

In recent years, machine-to-machine communication has attracted attention, in which a machine and a machine autonomously communicate with each other to exchange information. For example, in a 3rd generation partnership project radio access network long term evolution (3GPP LTE), the machine-to-machine communication is called machine type communication (MTC).

It has been considered to connect a machine which has not been connected to the network and other machines through a network, using the machine-to-machine communication, for effective use of various information.

Non Patent Document 1: RP-111112, "Proposed SID: Provision of low-cost MTC UEs based on LTE", Vodafone Group, 3GPP TSG RAN plenary #53RP-111112, "Proposed SID: Provision of low-cost MTC UEs based on LTE", Vodafone Group, 3GPP TSG RAN plenary #53.

Non Patent Document 2: R1-112912, "Overview on low-cost MTC UEs based on LTE", Huawei, HiSilicon, CMCC, 3GPP RAN1#66bis R1-112912, "Overview on low-cost MTC UEs based on LTE", Huawei, HiSilicon, CMCC, 3GPP RAN1#66bis.

Non Patent Document 3: R1-112917, "Considerations on approaches for low-cost MTC UEs", Sony Corporation/Sony Europe Ltd, 3GPP RAN1#66bisR1-112917, "Considerations on approaches for low-cost MTC UEs", Sony Corporation/Sony Europe Ltd, 3GPP RAN1#66bis.

Non Patent Document 4: R1-112929, "Standards aspects impacting UE costs", Ericsson, ST-Ericsson, 3GPP RAN1#66bis R1-112929, "Standards aspects impacting UE costs", Ericsson, ST-Ericsson, 3GPP RAN1#66bis.

Non Patent Document 5: 3GPP TR 36.888, "Study on provision of low-cost MTC UEs based on LTE" 3GPP TR 36.888, "Study on provision of low-cost MTC UEs based on LTE".

However, since a huge number of machine communication terminals which have not been connected to the network before are connected to the network, total processing time is increased in a system as a whole. Therefore, efficient processing in the system has been desired.

SUMMARY

According to an aspect of the embodiments, a communication system includes: a group including a plurality of communication terminals; and a base station. A first communication terminal in the group includes: an estimation unit that estimates path loss between the first communication terminal and the base station; and a transmission unit that transmits information about the estimated path loss to the base station. The base station includes: a reception unit that receives information about the path loss transmitted from the first communication terminal; and a transmission unit that transmits the received information about the path loss to second communication terminals other than the first communication terminal in the group. Each of the second communication terminals includes: a reception unit that receives the information about the path loss transmitted from the base station; and a determination unit that determines transmit power of the second communication terminal based on the received information about the path loss.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Embodiments of a communication system, a communication terminal, and a base station disclosed in the present application will be described below in detail with reference to the drawings. It is understood that the communication system, the communication terminal, and the base station disclosed in the present application are not limited to these embodiments. Further, configurations having the same functions in the embodiments are denoted by the same reference signs, and repeated description will be omitted. Further, in the following description, an LTE system or an LTE-advanced system being an enhancement of the LTE system is sometimes described as an example, but communication standard is not limited to the LTE system or the LTE-advanced system.

First Exemplary Embodiment

[Summary of Communication System]

Figure 1:
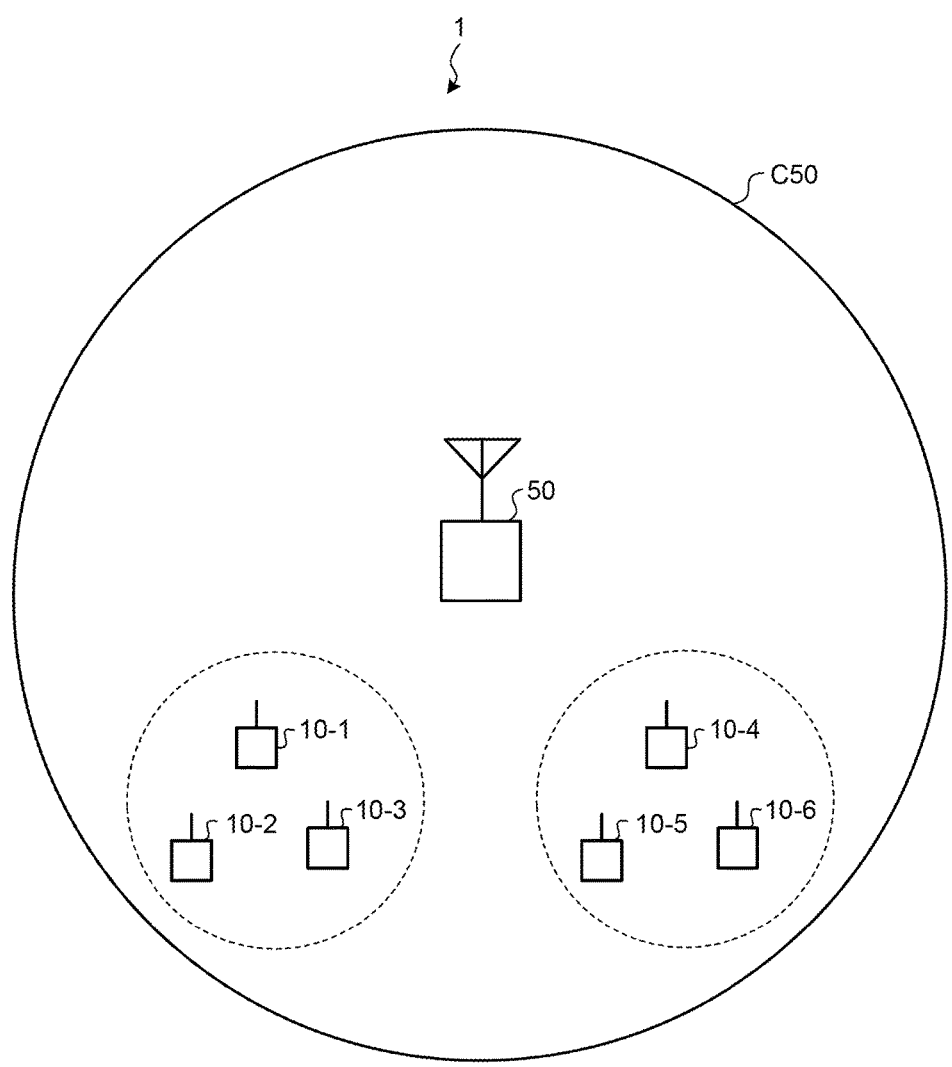
FIG. 1 is a diagram illustrating an example of a communication system according to a first embodiment.

FIG. 1 is a diagram illustrating an example of the communication system according to a first embodiment. In FIG. 1, a communication system 1 includes communication terminals 10-1 to 10-6, and a base station 50. The communication terminals 10-1 to 10-6 are within the range of a cell C50 of the base station 50. Here, six communication terminals 10-1 to 10-6 and one base station 50 are illustrated, but the numbers of communication terminals and base stations are not limited to those illustrated in FIG. 1. The communication terminals 10-1 to 10-6 are an MTC terminal such as a vending machine, a gas meter, or the like. Hereinafter, when the communication terminals 10-1 to 10-6 are not particularly distinguished, the communication terminals may be simply referred to as communication terminal 10 collectively.

The communication terminals 10-1 to 10-6 are divided into two groups. A first group includes the communication terminals 10-1 to 10-3, and a second group includes the communication terminals 10-4 to 10-6. A representative (head) communication terminal of the first group is the communication terminal 10-1, and the head communication terminal of the second group is the communication terminal 10-4. These groups and the head communication terminals are determined by the base station 50. For example, the base station 50 groups a plurality of communication terminals 10 each having a channel state similar to that of the base station itself.

Further, the communication terminal 10 has a sleep mode and a work mode (operation mode). In the sleep mode, the communication terminal 10 activates a communication function unit, only at the timing of transmission of a control signal from the base station 50, and stops the communication function unit at the other timing. Whereas, in the work mode, the communication terminal 10 always keeps the communication function unit activated.

The head communication terminals 10-1 and 10-4 are set to the work mode. Further, the communication terminals 10-2, 10-3, 10-5, and 10-6 being a non-head communication terminal are normally set to the sleep mode, and switched from the sleep mode to the work mode when receiving a wakeup message from the base station 50. Therefore, power consumption in the non-head communication terminal can be reduced. It is noted that the wakeup message is a control signal for switching the non-head communication terminal 10 from the sleep mode to the work mode.

Each of the head communication terminals 10-1 and 10-4 estimates path loss (PL) between itself and the base station 50, and transmits (reports) information about the estimated path loss to the base station 50.

The base station 50 transmits (reports) the information about the path loss received from the head communication terminal 10, to the non-head communication terminals 10 being in the same group as the head communication terminal 10. That is, the base station 50 transmits (reports) the information about the path loss received from the head communication terminal 10-1, to the non-head communication terminals 10-2 and 10-3 being in the same group as the head communication terminal 10-1. Further, the base station 50 transmits (reports) the information about the path loss received from the head communication terminal 10-4, to the non-head communication terminals 10-5 and 10-6 being in the same group as the head communication terminal 10-4. Here, the base station 50 may transmit (report) the information about the path loss with the wakeup message, when transmitting the wakeup message to each non-head communication terminal 10.

The non-head communication terminal 10 determines transmit power of itself, using the information about the path loss received from the base station 50. For example, the non-head communication terminal 10 determines the transmit power of itself, using the following formula (1).

[Mathematical formula 1]

$$P = \min(P_{TxMax}, P_0 + \alpha \cdot PL + 10 \cdot \log 10(M)) \quad (1)$$

Here, in formula (1), $P_{TxMax}$ is a maximum transmit power value of a target communication terminal 10. Further, PL is a path loss value between the target communication terminal 10 and the base station 50. Still further, M is the number of resource blocks assigned to the target communication terminal 10. Still another further, $\alpha$ is a path loss compensation factor, and may have a value from 0 to 1. $P_0$ is nominal transmit power defined for one resource block.

That is, the non-head communication terminal 10 determines the transmit power of itself, using as the path loss of itself the path loss measured by the head communication terminal 10 of the group to which the non-head communication terminal 10 itself belongs. Therefore, measurement of the path loss is eliminated in the non-head communication terminal 10, so that processing in transmit power control can be reduced. That is, efficient processing in the system can be achieved.

[Exemplary Configuration of Communication Terminal]

Figure 2:
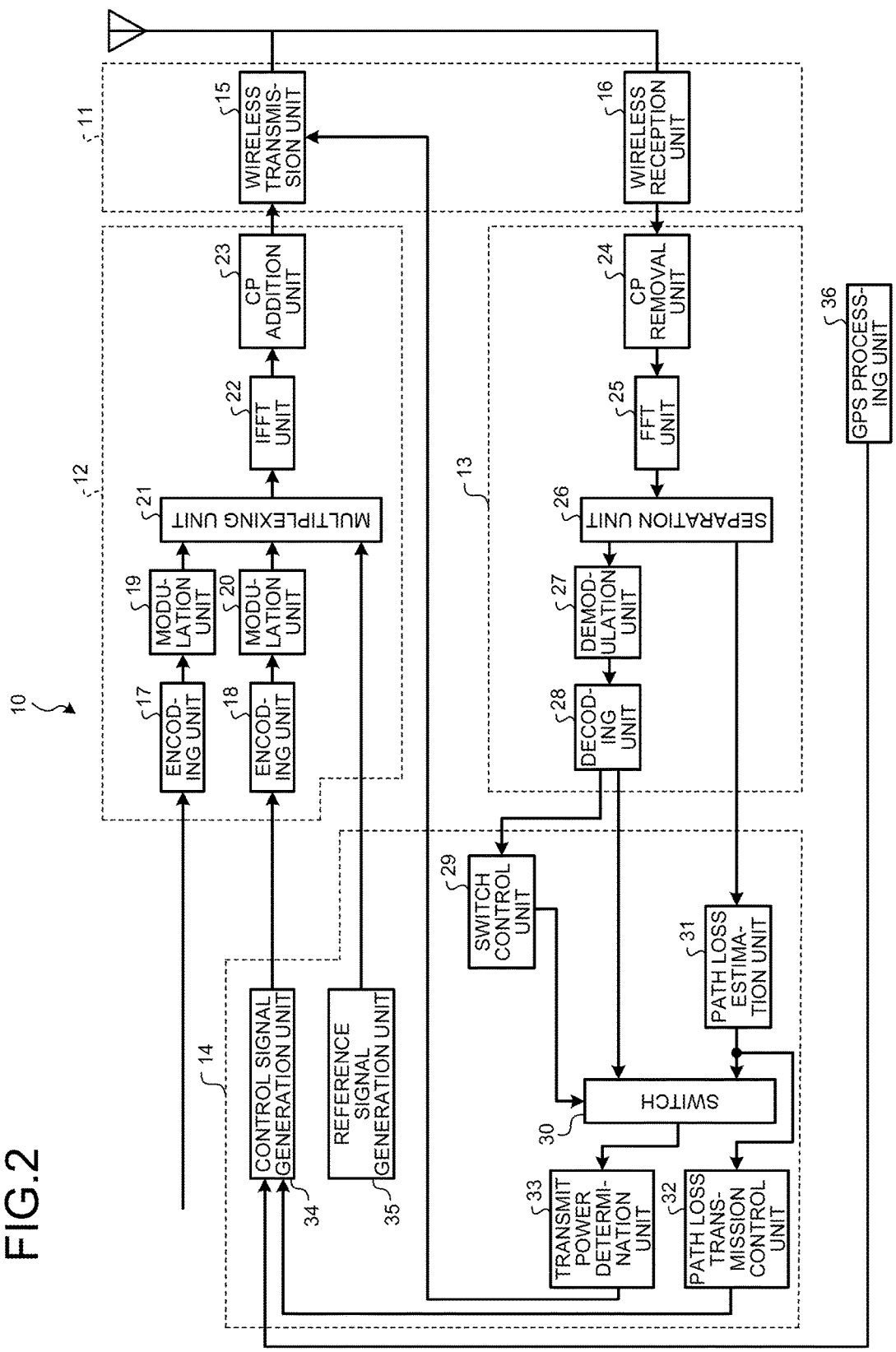
FIG. 2 is a block diagram illustrating an example of a communication terminal according to the first embodiment.

FIG. 2 is a block diagram illustrating an example of the communication terminal according to the first embodiment. In FIG. 2, the communication terminal 10 includes a wireless communication unit 11, a transmission unit 12, a reception unit 13, a control unit 14, and a GPS processing unit 36. The wireless communication unit 11 includes a wireless transmission unit 15 and a wireless reception unit 16. The transmission unit 12 includes encoding units 17 and 18, modulation units 19 and 20, a multiplexing unit 21, an inverse fast Fourier transform (IFFT) unit 22, and a cyclic prefix (CP) addition unit 23. The reception unit 13 includes a CP removal unit 24, a fast Fourier transform (FFT) unit 25, a separation unit 26, a demodulation unit 27, and a decoding unit 28. The control unit 14 includes a switch control unit 29, a switch 30, a path loss estimation unit 31, a path loss transmission control unit 32, a transmit power determination unit 33, a control signal generation unit 34, and a reference signal generation unit 35.

The wireless transmission unit 15 forms a radio signal by performing predetermined wireless transmission processing, i.e., digital-analog conversion, up-conversion, amplification, or the like, on an orthogonal frequency division multiplexing (OFDM) signal received from the transmission unit 12, and transmits the formed radio signal through an antenna. It is noted that the wireless transmission unit 15 amplifies the OFDM signal to a transmit power value received from the control unit 14.

The wireless reception unit 16 performs predetermined wireless reception processing, i.e., down-conversion, analog-digital conversion, or the like, on a reception signal received through the antenna, and outputs the reception signal to the reception unit 13 after the wireless reception processing.

The encoding unit 17 performs encoding processing on transmission data addressing to the communication terminal 10, i.e., user data, and outputs the encoded transmission data to the modulation unit 19.

The modulation unit 19 modulates the encoded transmission data received from the encoding unit 17, and outputs the modulated transmission data to the multiplexing unit 21.

The encoding unit 18 performs encoding processing on the control signal received from the control unit 14, and outputs the encoded control signal to the modulation unit 20.

The modulation unit 20 modulates the encoded control signal received from the encoding unit 18, and outputs the modulated control signal to the multiplexing unit 21.

The multiplexing unit 21 maps input signals to a predetermined resource for multiplexing, and outputs a multiple signal to the IFFT unit 22.

Specifically, the multiplexing unit 21 maps the control signal received from the modulation unit 20 to a resource area assigned to a downlink control channel (e.g., PDCCH: physical downlink control channel).

Further, the multiplexing unit 21 maps the transmission data received from the modulation unit 19 to an assigned downlink resource assigned to a destination communication terminal 10.

Further, the multiplexing unit 21 maps a reference signal received from the control unit 14 to the predetermined resource.

The IFFT unit 22 performs inverse fast Fourier transform on the multiple signals received from the multiplexing unit 21 to form the OFDM signal, and outputs the formed OFDM signal to the CP addition unit 23.

The CP addition unit 23 adds a CP to the OFDM signal received from the IFFT unit 22, for each symbol, and outputs the OFDM signal to which the CP is added to the wireless communication unit 11.

The CP removal unit 24 removes the CP from the reception signal received from the wireless communication unit 11, and outputs the reception signal from which the CP is removed to the FFT unit 25.

The FFT unit 25 performs fast Fourier transform on the reception signal received from the CP removal unit 24, and outputs the reception signal obtained after the fast Fourier transform, to the separation unit 26.

The separation unit 26 extracts the control signal and the reference signal from the reception signal received from the FFT unit 25, outputs the extracted control signal to the demodulation unit 27, and outputs the extracted reference signal to the path loss estimation unit 31.

The demodulation unit 27 demodulates the control signal received from the separation unit 26, and outputs the demodulated control signal to the decoding unit 28.

The decoding unit 28 decodes the control signal received from the demodulation unit 27. Then, the decoding unit 28 outputs terminal type information included in the decoded control signal and addressed to the decoding unit 28 itself, to the switch control unit 29, and outputs information about the path loss to the decoding unit 28 itself or the group to which the decoding unit 28 itself belongs, to the switch 30.

The switch control unit 29 switches the switch 30 based on the terminal type information addressed to the switch control unit 29 itself. Specifically, when the terminal type information represents the non-head communication terminal, the switch control unit 29 switches the switch 30 so that the information about the path loss output from the decoding unit 28 is input to the transmit power determination unit 33. Whereas, when the terminal type information represents the head communication terminal, the switch control unit 29 switches the switch 30 so that an estimated path loss value output from the path loss estimation unit 31 is input to the transmit power determination unit 33.

When the path loss transmission control unit 32 itself is the head communication terminal, the path loss transmission control unit 32 outputs information about a path loss value estimated by the path loss estimation unit 31 to the control signal generation unit 34.

When the transmit power determination unit 33 itself is the head communication terminal, the transmit power determination unit 33 receives the path loss value estimated by the path loss estimation unit 31, and determines the transmit power of itself, based on the path loss value. Whereas, when the transmit power determination unit 33 itself is the non-head communication terminal, the transmit power determination unit 33 determines the transmit power of itself based on the information about the path loss output from the decoding unit 28, i.e., the path loss value estimated by the head communication terminal. The transmit power determination unit 33 outputs a determined value of the transmit power to the wireless transmission unit 15.

The GPS processing unit 36 determines the position of the communication terminal 10 using a GPS, and outputs information about the measured position to the control signal generation unit 34.

The control signal generation unit 34 generates a control signal including the information about the path loss received from the path loss transmission control unit 32, and outputs the generated control signal to the encoding unit 18. Further, the control signal generation unit 34 generates a control signal including positional information received from the GPS processing unit 36, and outputs the generated control signal to the encoding unit 18.

The reference signal generation unit 35 generates a reference signal, and outputs the generated reference signal to the multiplexing unit 21.

[Exemplary Configuration of Base Station]

Figure 3:
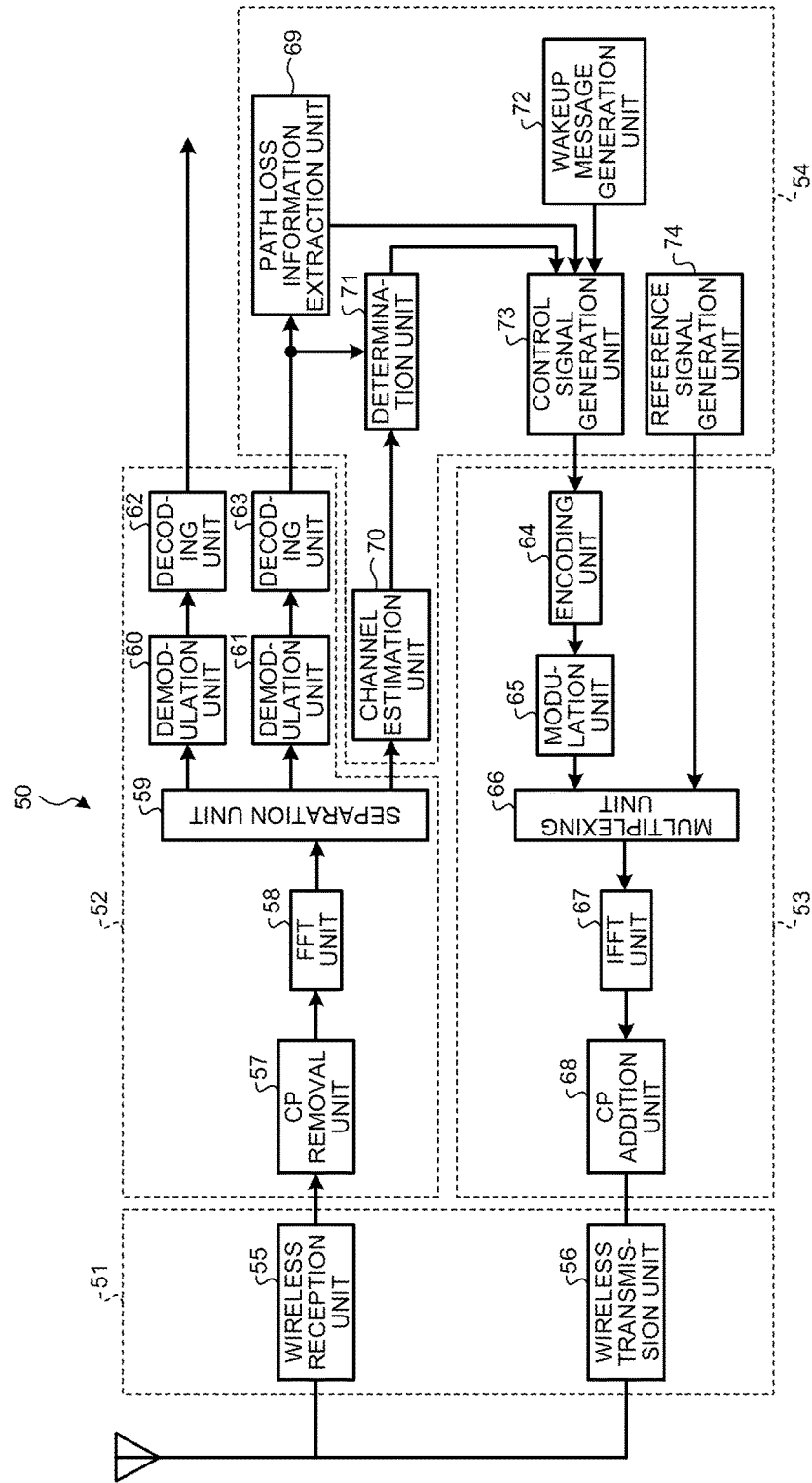
FIG. 3 is a block diagram illustrating an example of a base station according to the first embodiment.

FIG. 3 is a block diagram illustrating an example of the base station according to the first embodiment. In FIG. 3, the base station 50 includes a wireless communication unit 51, a reception unit 52, a transmission unit 53, and a control unit 54. The wireless communication unit 51 includes a wireless reception unit 55 and a wireless transmission unit 56. The reception unit 52 includes a CP removal unit 57, an FFT unit 58, a separation unit 59, demodulation units 60 and 61, and decoding units 62 and 63. The transmission unit 53 includes an encoding unit 64, a modulation unit 65, a multiplexing unit 66, an IFFT unit 67, and a CP addition unit 68. The control unit 54 includes a path loss information extraction unit 69, a channel estimation unit 70, a determination unit 71, a wakeup message generation unit 72, a control signal generation unit 73, and a reference signal generation unit 74.

The wireless reception unit 55 performs predetermined wireless reception processing, i.e., down-conversion, analog-digital conversion, or the like, on a reception signal received through an antenna, and outputs the reception signal after the wireless reception processing to the reception unit 52.

The wireless transmission unit 56 performs predetermined wireless transmission processing, i.e., digital-analog conversion, up-conversion, amplification, or the like on an OFDM signal received from the transmission unit 53 to form a radio signal, and transmits the formed radio signal through the antenna.

The CP removal unit 57 removes a CP from the reception signal received from the wireless communication unit 51, and outputs the reception signal from which the CP is removed to the FFT unit 58.

The FFT unit 58 performs fast Fourier transform on the reception signal received from the CP removal unit 57, and outputs the reception signal obtained after the fast Fourier transform to the separation unit 59.

The separation unit 59 extracts a data signal, a control signal, and a reference signal, from the reception signal received from the FFT unit 58, outputs the extracted data signal to the demodulation unit 60, outputs the extracted control signal to the demodulation unit 61, and outputs the extracted reference signal to the channel estimation unit 70.

The demodulation unit 60 demodulates the data signal received from the separation unit 59, and outputs the demodulated data signal to the decoding unit 62.

The decoding unit 62 decodes the data signal received from the demodulation unit 60, and outputs the obtained decoded data to a succeeding function unit.

The demodulation unit 61 demodulates the control signal received from the separation unit 59, and outputs the demodulated control signal to the decoding unit 63.

The decoding unit 63 decodes the control signal received from the demodulation unit 61, and outputs the decoded control signal to the determination unit 71 and the path loss information extraction unit 69.

The path loss information extraction unit 69 extracts the information about the path loss estimated by the head communication terminal 10 of each group from the control signal received from the decoding unit 63, and outputs the information about the path loss to the control signal generation unit 73.

The channel estimation unit 70 estimates a channel state between each communication terminal 10 and the channel estimation unit 70 itself, based on the reference signal transmitted from each communication terminal 10.

The determination unit 71 extracts positional information of each communication terminal 10 transmitted from each communication terminal 10 from the control signal received from the decoding unit 63, and groups a plurality of communication terminals 10 based on the extracted positional information. Specifically, when a plurality of communication terminals 10 are separated from one another with a distance of not more than a predetermined value, it is supposed that the plurality of communication terminals 10 have mutually similar channel states. Accordingly, the determination unit 71 forms a group of the plurality of communication terminals 10 separated from one another with a distance of not more than a predetermined value. It is noted that the determination unit 71 may group the plurality of communication terminals 10, based on the channel state estimated by the channel estimation unit 70, instead of the positional information. Therefore, communication terminals 10 belonging to different groups are collected into one group according to the position, so that the number of non-head communication terminals 10 can be increased. Accordingly, the number of communication terminals 10 by which the processing can be reduced is increased, so that further efficient processing can be achieved in the system.

Further, the determination unit 71 selects one head communication terminal 10 from the communication terminals 10 belonging to each group. For example, the determination unit 71 selects, as the head communication terminal 10, a communication terminal 10 most frequently communicating with the determination unit 71, from the communication terminals 10 belonging to each group.

The wakeup message generation unit 72 generates the wakeup message addressing to each non-head communication terminal 10, at the timing of switching each non-head communication terminal 10 from the sleep mode to the work mode, and outputs the wakeup message to the control signal generation unit 73.

The control signal generation unit 73 generates a control signal including information about the group and the head communication terminal 10 of the group determined by the determination unit 71, and identification information of the group or destination information of the communication terminals 10 belonging to the group, and outputs the generated control signal to the encoding unit 64.

Further, the control signal generation unit 73 generates a control signal including the information about the path loss extracted by the path loss information extraction unit 69, and the identification information of the group or the destination information of the non-head communication terminals 10 of the group corresponding to the information, and outputs the generated control signal to the encoding unit 64. Further, the control signal generation unit 73 generates a control signal including a path loss reporting period, addressing to each head communication terminal 10, and outputs the generated control signal to the encoding unit 64.

Further, the control signal generation unit 73 generates a control signal including the wakeup message generated by the wakeup message generation unit 72, and outputs the generated control signal to the encoding unit 64.

It is noted that the control signal generation unit 73 may generate a control signal including with the wakeup message the information about the path loss extracted by the path loss information extraction unit 69, and the identification information of the group corresponding to the information or the destination information of the non-head communication terminals 10 of the group. That is, the transmission unit 53 may transmit the wakeup message and the information about the path loss at the same timing. Therefore, a signaling amount between the base station 50 and the non-head communication terminal 10 can be reduced.

Further, information sets included in the control signal to be transmitted by the control signal generation unit 73 is transmitted through, for example, a physical downlink control channel (PDCCH). Alternatively, each information set may be transmitted through an upper layer channel. Alternatively, each information set may be input to the encoding unit 17 to be transmitted through a data channel. Further, a channel through which each information set is transmitted may be a dedicated channel or a common channel.

[Exemplary Operation of Communication System]

Figure 4:
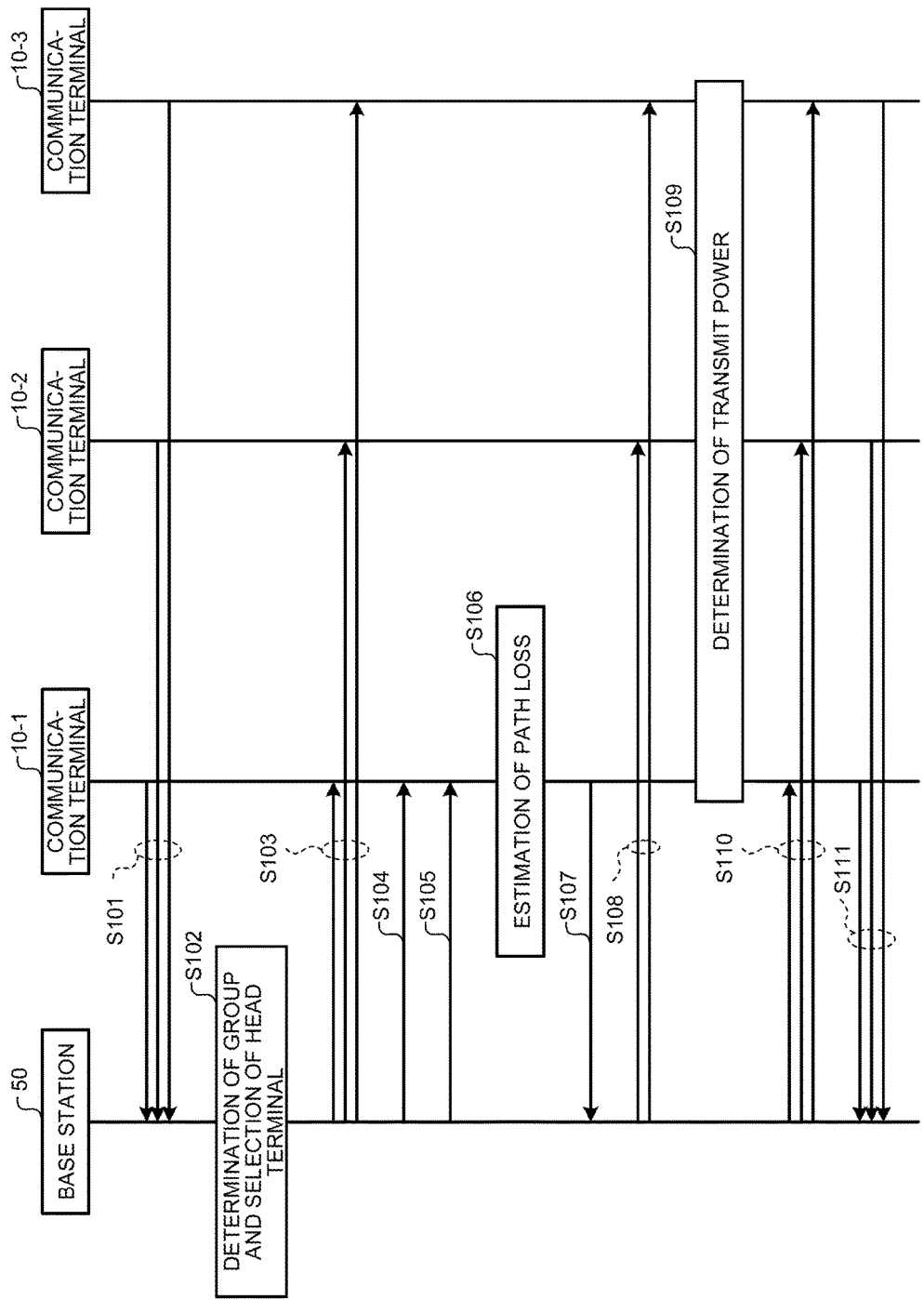
FIG. 4 is a sequence diagram illustrating an example of processing operation of the communication system according to the first embodiment.

Processing operation of the communication system 1 having the above-mentioned configuration will be described. FIG. 4 is a sequence diagram illustrating an example of the processing operation of the communication system according to the first embodiment. Here, the first group illustrated in FIG. 1 will be described as an example.

The communication terminals 10-1 to 10-3 each transmit the control signal including positional information of itself to the base station 50 (step S101).

In the base station 50, the determination unit 71 determines groups and a head communication terminal 10 of each group, based on the control signals transmitted from the communication terminals 10-1 to 10-3 (step S102). Specifically, the determination unit 71 extracts the positional information from the control signal, and forms one group of the communication terminals 10 separated from one another with a distance of not more than a predetermined value based on the extracted positional information. Here, it is assumed that the base station 50 forms a group of the communication terminals 10-1 to 10-3. The base station 50 selects for example a communication terminal 10 most frequently communicating with the base station 50 in each group, as the head communication terminal 10 of each group. Here, it is assumed that the base station 50 selects the communication terminal 10-1 as the head communication terminal 10 of the first group.

The base station 50 transmits the identification information of the group to which each communication terminal 10 belongs, and the information about the head communication terminal 10 in the group to each communication terminal 10 (step S103). For this transmission, for example the physical downlink control channel (PDCCH) can be used.

The base station 50 reports information about the reporting period to the head communication terminal 10, i.e., the communication terminal 10-1 here, using upper layer signaling (step S104).

The base station 50 transmits the reference signal (step S105).

The communication terminal 10-1 being the head communication terminal 10 estimates the path loss between itself and the base station 50 based on the reference signal transmitted from the base station 50 (step S106), and transmits (reports) the estimated information about the path loss to the base station 50 (step S107).

The base station 50 transmits the wakeup message to the non-head communication terminals 10, i.e., the communication terminals 10-2 and 10-3 here, at the timing of switching the non-head communication terminals 10 of the first group to the work mode (step S108). At that time, the base station 50 transmits the information about the path loss reported from the head communication terminal 10, with the wakeup message, to the non-head communication terminals 10.

Each communication terminal 10 determines the transmit power of itself, using the obtained path loss (step S109). Specifically, the communication terminal 10-1 being the head communication terminal 10 determines the transmit power of itself, using the path loss estimated by itself. Whereas, the communication terminals 10-2 and 10-3 being the non-head communication terminal 10 each determine the transmit power of itself, using the path loss value estimated by the communication terminal 10-1, received through the base station 50. Here, the communication terminals 10-2 and 10-3 having received the information about the path loss with the wakeup message can immediately calculate the transmit power of themselves, immediately after switched to the work mode.

The base station 50 performs scheduling for each of the communication terminals 10-1 to 10-3, and transmits information about an assigned resource block, to each of the communication terminals 10-1 to 10-3 (step S110).

Each of the communication terminals 10-1 to 10-3 transmits data, using the resource block assigned to itself (step S111). For this transmission, for example, a physical uplink common channel (PUSCH) is used.

As described above, according to the present embodiment, in the communication terminal 10 being the non-head communication terminal, the reception unit 13 receives the information, transmitted from the base station 50, about the path loss between the base station 50 and the communication terminal 10 being the head communication terminal in the group to which itself belongs. Then, the transmit power determination unit 33 determines the transmit power of itself, based on the information about the path loss received by the reception unit 13.

Owing to this configuration of the communication terminal 10, when the communication terminal 10 is the non-head communication terminal, the path loss estimated by the communication terminal 10 being the head communication terminal can be used for determination of the transmit power of itself without estimating the path loss between itself and the base station 50. Therefore, the measurement of the path loss is eliminated in the communication terminal 10 being the non-head communication terminal, so that the processing in transmit power control can be reduced. That is, efficient processing in the system can be achieved.

Further, the non-head communication terminal 10 is normally set to the sleep mode, and when the wakeup message is received from the base station 50, the non-head communication terminal 10 is switched from the sleep mode to the work mode. Therefore, power consumption in the non-head communication terminal can be reduced.

The non-head communication terminal 10 receives the information about the path loss, with the wakeup message. Therefore, immediately after the non-head communication terminal 10 is switched to the work mode, the transmit power of itself can be determined.

Further, in the base station 50, the reception unit 52 receives the information, transmitted from the head communication terminal 10, about the path loss between the head communication terminal 10 and itself. Then, the transmission unit 53 transmits the information about the path loss received by the reception unit 52 to the non-head communication terminals 10 belonging to the group of the head communication terminal 10.

Owing to this configuration of the base station 50, the measurement of the path loss is eliminated in the non-head communication terminal 10, so that the processing in transmit power control can be reduced. That is, efficient processing in the system can be achieved.

Further, the transmission unit 53 transmits the information about the path loss, with the wakeup message. Therefore, a signaling amount between the base station 50 and the non-head communication terminal 10 can be reduced.

[Other Embodiments]

Component elements of the units illustrated in the first embodiment are not necessarily physically configured as illustrated in the drawings. That is, the specific mode of distribution or integration of each unit is not limited to the one as illustrated in the drawings. The whole or part thereof may be distributed or integrated functionally or physically in arbitrary units according to various kinds of loads, usage conditions, or the like.

Further, the whole or arbitrary part of various processing functions performed in each device may be performed on a central processing unit (CPU) (or a microcomputer such as a micro processing unit (MPU) or a micro controller unit (MCU)). Further, the whole or arbitrary part of various processing functions may be implemented by programs analyzed and executed by a CPU (or a microcomputer such as an MPU or MCU) or by wired logic hardware.

The communication terminal and the base station according to the first embodiment can include the following hardware configuration.

Figure 5:
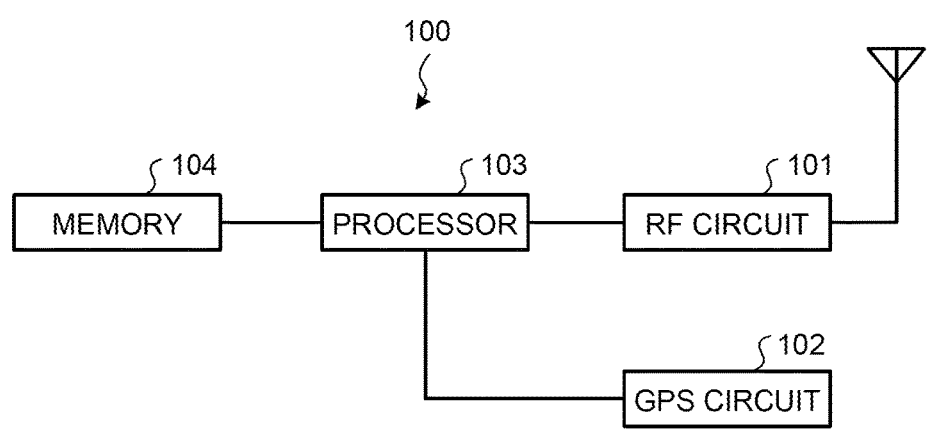
FIG. 5 is a diagram illustrating a hardware configuration of a communication terminal.

FIG. 5 is a diagram illustrating an exemplary hardware configuration of a communication terminal. As illustrated in FIG. 5, a communication terminal 100 includes a radio frequency (RF) circuit 101, a GPS circuit 102, a processor 103, and a memory 104.

As an example, the processor 103 includes a central processing unit (CPU), a digital signal processor (DSP), a field programmable gate array (FPGA), or the like. Further, as an example, the memory 104 includes a random access memory (RAM) such as a synchronous dynamic random access memory (SDRAM), a read only memory (ROM), a flash memory, and the like.

The various processing functions performed in the communication terminal according to the first embodiment may be achieved by executing programs stored in various memories such as a non-volatile storage medium, by a processor included in an amplification device. That is, programs corresponding to processing performed by the transmission unit 12, the reception unit 13, and the control unit 14 may be recorded in the memory 104 so that the programs are executed by the processor 103. Further, the processing performed by the transmission unit 12, the reception unit 13, and the control unit 14 may be executed by being divided by a plurality of processors such as a base band CPU, and an application CPU. Further, the wireless communication unit 11 includes an RF circuit 101. Further, the GPS processing unit 36 includes a GPS circuit 102.

Figure 6:
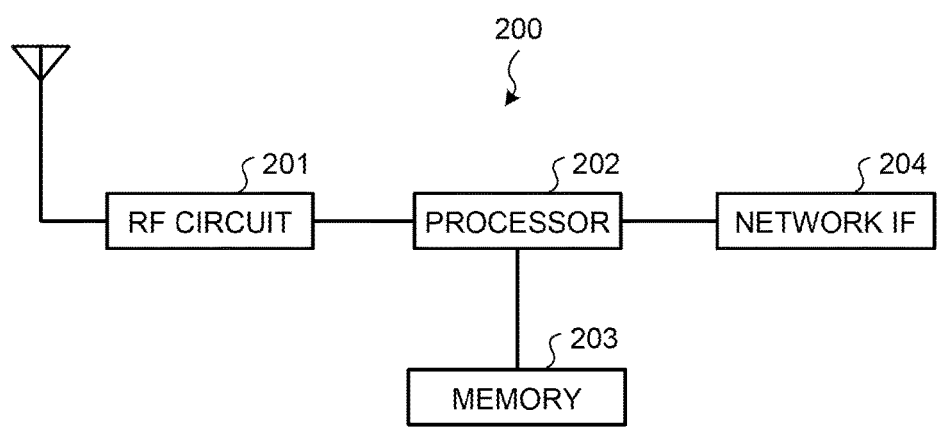
FIG. 6 is a diagram illustrating a hardware configuration of a base station.

FIG. 6 is a diagram illustrating an exemplary hardware configuration of a base station. As illustrated in FIG. 6, a base station 200 includes an RF circuit 201, a processor 202, a memory 203, and a network interface (IF) 204. As an example, the processor 202 includes a CPU, a DSP, a FPGA or the like. Further, as an example, the memory 203 includes a RAM such as an SDRAM, a ROM, a flash memory, or the like.

Various processing functions performed by the base station according to the first embodiment may be achieved by performing programs stored in various memories such as non-volatile storage mediums by a processor included in an amplification device. That is, programs corresponding to processing performed by the reception unit 52, the transmission unit 53, and the control unit 54 may be recorded in the memory 203 so that the programs are executed by the processor 202.

According to the disclosed mode, the efficient processing in the system can be achieved.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A communication system comprising:
   a group including a plurality of communication terminals; and
   a base station,
   wherein a first communication terminal in the group includes:
      an estimation unit that estimates path loss between the first communication terminal and the base station; and
      a transmission unit that transmits information about the estimated path loss to the base station,
   the base station includes:
      a reception unit that receives information about the path loss transmitted from the first communication terminal; and
      a transmission unit that transmits the received information about the path loss to second communication terminals other than the first communication terminal in the group, and
   each of the second communication terminals includes:
      a reception unit that receives the information about the path loss transmitted from the base station; and
      a determination unit that determines transmit power of the second communication terminal based on the received information about the path loss, wherein the determination unit determines the transmit power of the second communication terminal itself by using the path loss measured by the first communication terminal in a group to which the second communication terminal belongs as the path loss of the second communication terminal, wherein
   the second communication terminal has an operation mode and a sleep mode, and
   the transmission unit of the base station transmits the information about the path loss to the second communication terminal in the sleep mode, with a control signal for switching to the operation mode, wherein
   the transmission unit of the base station transmits a wakeup message and information about the path loss.

2. The communication system according to claim 1, wherein the transmission unit of the base station transmits the control signal for switching to the operation mode and the information about the path loss to the second communication terminal, as a dedicated message.

3. The communication system according to claim 1, wherein a distance between each second communication terminal included in a first group and the first communication terminal of the first group is smaller than a distance between each communication terminal included in a second group and the first communication terminal of the first group.

* * * * *